(12) United States Patent
Leftwich et al.

(10) Patent No.: US 8,715,048 B2
(45) Date of Patent: May 6, 2014

(54) ELECTRONIC GAME AND METHOD

(76) Inventors: James J. Leftwich, Palo Alto, CA (US); Stephen S Doss, San Carlos, CA (US)

(*) Notice: Subject to any disclaimer, the term of this patent is extended or adjusted under 35 U.S.C. 154(b) by 685 days.

(21) Appl. No.: 12/758,992

(22) Filed: Apr. 13, 2010

(65) Prior Publication Data

US 2010/0273554 A1    Oct. 28, 2010

Related U.S. Application Data

(60) Provisional application No. 61/214,533, filed on Apr. 24, 2009.

(51) Int. Cl.
*A63F 9/24* (2006.01)

(52) U.S. Cl.
USPC .............................. 463/7; 463/31

(58) Field of Classification Search
USPC ...................................... 463/7, 31
See application file for complete search history.

(56) References Cited

U.S. PATENT DOCUMENTS 6,318,722 B1*  11/2001  Shafer .......................... 273/272
2005/0043073 A1*  2/2005  Shoemaker, Jr. .................. 463/7

OTHER PUBLICATIONS

Spencer, Spanner. "Flight Control". www.pocketgamer.co.uk. Online. Accessed via the Internet. Accessed Jun. 22, 2012. <URL:http://www.pocketgamer.co.uk/r/iPhone/Flight+Control/review.asp?c=12348>.*
"Flight Control (video game)". www.wikipedia.org. Online Accessed via the Internet. Accessed Jun. 22, 2012. <URL:http://en.wikipedia.org/wiki/Flight_Control_(video_game)>.*
UniqueApps. "Flight Control iPhone App Review". www.youtube.com/ Online. Accessed via the Internet. Accessed Jun. 22, 2012. <URL: http://www.youtube.com/watch?v=MADHFGcmKFs>.*
"TransBot". www.wikipedia.org. Online Accessed via the Internet. Accessed Jun. 22, 2012. <URL:http://en.wikipedia.org/wiki/TransBot>.*
"TransBot". www.giantbomb.com. Online. Accessed via the Internet. Accessed Jun. 22, 2012. <URL:http://www.giantbomb.com/transbot/61-15686/>.*
She Game.com. Online. Nov. 27, 2007. Accessed via the Internet. Accessed Mar. 23, 2013. <URL:http://web.archive.org/web/20071127055159/http://www.shegame.com/view/4914/Kitties>.*
Kitties. Girls-games.roro44.com. Online. Accessed via the Internet. Accessed Mar. 23, 2013. <URL:http:girls-games.roro44.com/en/487-kitties.html>.*
Uniball Interactive Game. Uniball.com. Online. May 20, 2007. Accessed via the Internet. Accessed Mar. 23, 2013. <URL:http://web.archive.org/web/20070520025104/http://www.uniball.com/?mid=131&aid=192>.*
Pens gameplay. Screenshots. <URL:http://web.archive.org/web/20070520025104/http://www.uniball.com/?mid=131&aid=192>.*
(Arcade)Asteroids.Youtube.com. Online. Oct. 3, 2008. Accessed via the Internet. Accessed Nov. 14, 2013. <URL:http://www.youtube.com/watch?v=WYSupJ5r2zo>.*

* cited by examiner

*Primary Examiner* — Dmitry Suhol
*Assistant Examiner* — Carl V Larsen
(74) *Attorney, Agent, or Firm* — Dergosits & Noah LLP (57) ABSTRACT

An electronic game and method are set forth wherein the objective of the electronic game, playable by one or more persons, is to select moving or stationary game elements and move them to or otherwise cause them to make contact with a matched or otherwise associated goal and thus score points, and do so among a game space containing other moving and/or stationary game elements which themselves may be selected and moved by the player, and which if contacted by a user-controlled game element may result in either beneficial or detrimental consequences to the configuration of the playing field, the elements themselves, scoring, and progression of the game.

21 Claims, 11 Drawing Sheets

ELECTRONIC GAME AND METHOD

CROSS-REFERENCE TO RELATED APPLICATIONS

The present application claims priority to U.S. Provisional Patent Application No. 61/214,533 filed Apr. 24, 2009, the contents of which are hereby incorporated by reference.

FIELD OF THE INVENTION

The present invention is an electronic game playable by one or more persons on a portable electronic device.

BACKGROUND

Computing devices capable of supporting game play have become widespread and support a growing range of interactive methods. These include directional button controls, joysticks, mice, trackballs, trackpads, touch-sensitive displays, and interaction via device or controller pitch and motion sensing. Despite the large and growing number of computer games, very few combine an elegantly simple objective with a nearly infinite range of game playing dynamics. Few are nearly instantly learnable and playable while offering significant opportunity for growth and mastery of player skill and strategy. Few can be played across a wide variety of devices and interactive controls. Few combine all of these qualities while allowing a range of play styles from solo to competitive, and from calming and casual to intense and stimulating. And fewer still appeal to all age groups from child to elderly, and men and women. In short, successful games that are simple, unique, and offer a complex range of play are exceedingly rare.

SUMMARY OF THE INVENTION

The present invention pertains to computer-processor-based action games and amusements and, more particularly, to a game in which the object is to move elements, which may be a shape or otherwise visually embodied object, to matched or otherwise associated goals, which themselves are visually or otherwise associated with or matched to certain elements, while avoiding other elements that are detrimental and contacting or joining with elements that provide scoring benefits. The combination of a plurality of moving elements in the playing space and the player's own moving of elements creates the potential for virtually infinite variation of play. The simplicity of the game's basic objective, which is to clear the playing space by moving all elements to their respective goals and thus advance to a subsequent higher level where there are more elements and/or more challenging game attributes, is both quickly graspable and directly demonstrable. This makes the present invention a game that is very quick and easy to learn and play. Relationships among the elements can be configured such that contacting certain elements may result in them being combined as a single larger element with a higher goal scoring value, but simultaneously increasing the difficulty of maneuvering it around the playing space and avoiding elements that would be detrimental because of its larger size.

The present invention allows for a variety of criteria to determine scoring and game length. Such criteria may include scoring or subtracting points, actions or events that may yield a positive or negative effect on the health attribute of game session lives, and time taken to complete levels and the total game to determined or player-declared end all contribute to rich game play and the potential for strategy and learned skills for maximizing scores.

The present invention is a method set forth for an electronic game playable by one or more persons, in which the objective of the game is to select moving or stationary game elements and move them to or otherwise cause them to make contact with a matched or otherwise associated goal and thus score points, and do so among a game space containing other moving and/or stationary game elements which themselves may be selected and moved by the player, and which if contacted by a user-controlled game element may result in either beneficial or detrimental consequences to the configuration of the playing field, the elements themselves, scoring, and progression of the game. The game of the present invention requires the use of a computer or processor, a display, and the means to select and move objects around either directly by touch or with a stylus, a mouse or tracking device and associated screen cursor, directional controls, or via tilting or moving the device itself.

DETAILED DESCRIPTION

For purposes of describing the present invention in sufficient detail and in a real application, the embodiment of a game program for computing devices will be used as an example here. It is typical of games embodied on desktop computers, touch-sensitive or stylus-sensitive slate computers, handheld personal data assistants, handheld mobile phones capable of running game programs, and handheld gaming and media devices also capable of running game programs.

The present invention supports and provides the means for conducting an electronic game playable by one or more persons, in which the object of the game is to select moving or stationary elements and move them to a matched or otherwise associated goal and do so among a field of other moving and/or stationary elements, which if contacted may be either beneficial or detrimental to the configuration of the playing field, the elements themselves, scoring, and progression of the game. The game of the present invention requires the use of a computer or processor, a display, and the means to select and move objects around either directly by touch or with a stylus, a mouse or tracking device and associated screen cursor, directional controls, or via tilting or moving the device itself.

The combination of a plurality of moving elements in the playing space and the player's own moving of elements around the playing space, avoiding detrimental elements and making contact with beneficial elements in order to score goals and associated points and achieve objectives to advance to subsequent higher game levels, creates the potential for virtually infinite variation of play. The simplicity of the game's basic objective, which in the preferred embodiment is to clear the playing space by moving all elements to their respective goals and thus advance to a subsequent higher level where there are more elements and/or more challenging game attributes, is both quickly graspable and directly demonstrable. This makes the present invention a game that is very quick and easy to learn and play. Relationships among the elements can be configured such that contacting certain elements may result in them being combined as a single larger element or otherwise transformed into an element with a higher goal scoring value. This same transformation, however, may simultaneously increase the difficulty of maneuvering the new game element around the playing space and avoiding elements that would be detrimental because of its larger size or other similarly challenging attributes or behaviors.

For purposes of describing the key dynamics in the present invention, a limited variation of embodiments of game elements and goals will be described. The present invention supports a wide range of embodiments for the shape, appearance, and behavior of the playing space, the player-moved game elements, other non-player-movable game elements, the goals, as well as variations on the interrelationships among these, scoring strategy, game lives, and game level progression.

Figure 1:
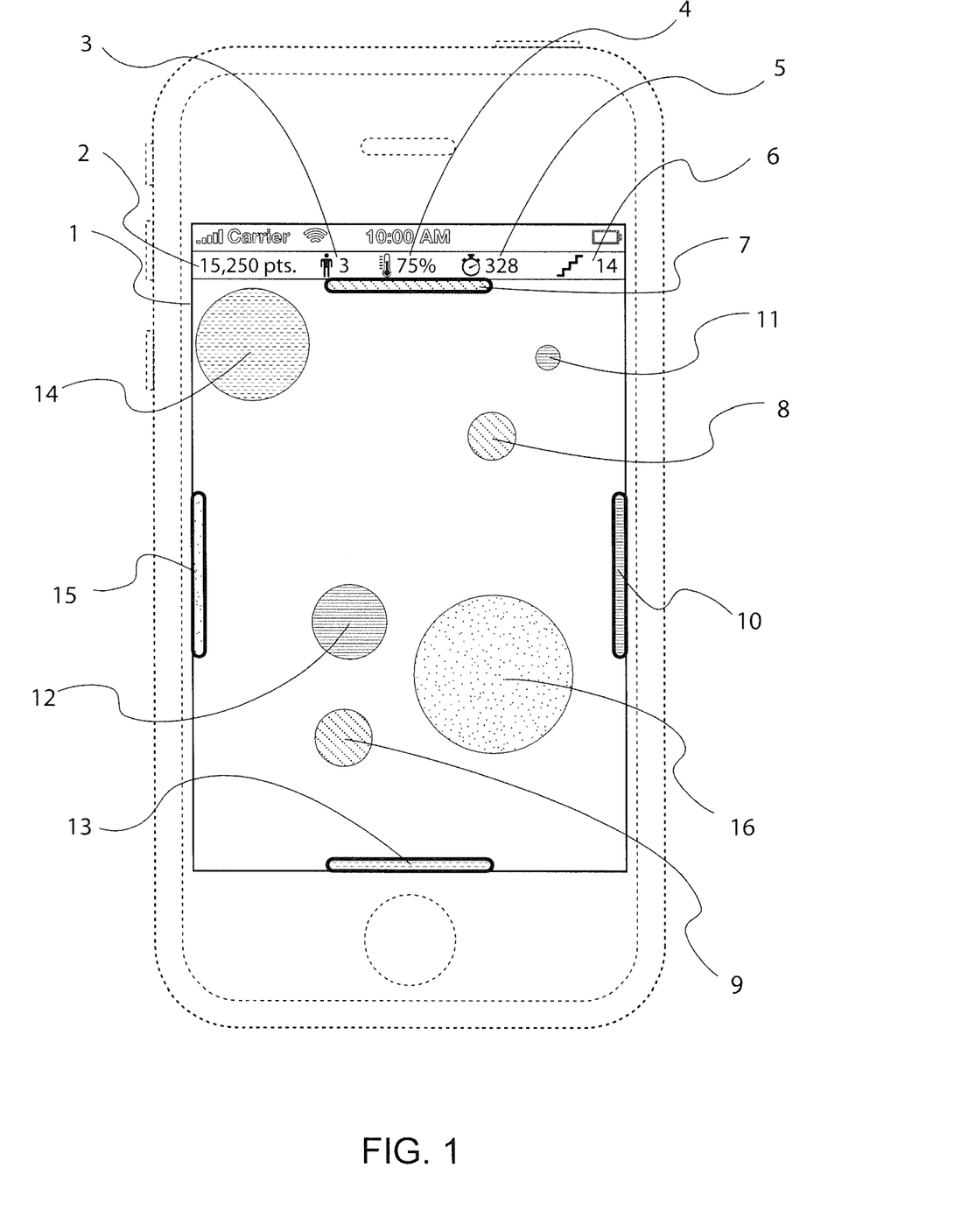
FIG. 1 illustrates an embodiment of the present invention on a display of a portable electronic device.

In FIG. 1 the present invention is depicted as embodied and running on a computer-processor-based device with a touch-capable display 1. It shows the optionally displayed game information display area at the top of the display containing the current game score, shown here as 15, 250 points 2, the number of game lives remaining, shown here as three game lives 3, the remaining health percentage of the currently active game life, shown here as currently being 75% of the first of three game lives 4, the running time for the current game level, shown here as 328 seconds 5, and the current level number, shown here as Level 14, 6. Also depicted are the game's goals, a red goal 7 depicted herein by a diagonal line pattern, a yellow goal 10 herein depicted as a horizontal line pattern, a green goal 13 herein depicted as a regularly-ordered dot pattern, and a blue goal 15 herein depicted as an irregularly-ordered dot pattern. Also shown are the game's playing elements, two red playing elements 8, 9, two yellow playing elements 11, 12, a green playing element 14, and a blue playing element 16, each of which the user's objective is to manually move by direct or indirect means to the playing elements' respective matching or otherwise associated goals to score points and eventually clear the field of user-movable playing elements, thus advancing to the next game level. The present invention supports any number of differentiated attributes between player-moveable game elements and matched or otherwise associated goals such as, but not limited to, matching colors or patterns. The present invention also anticipates that in some embodiments these may change in sequential or random order to a limited or unlimited number of differentiated attributes.

Figure 2:
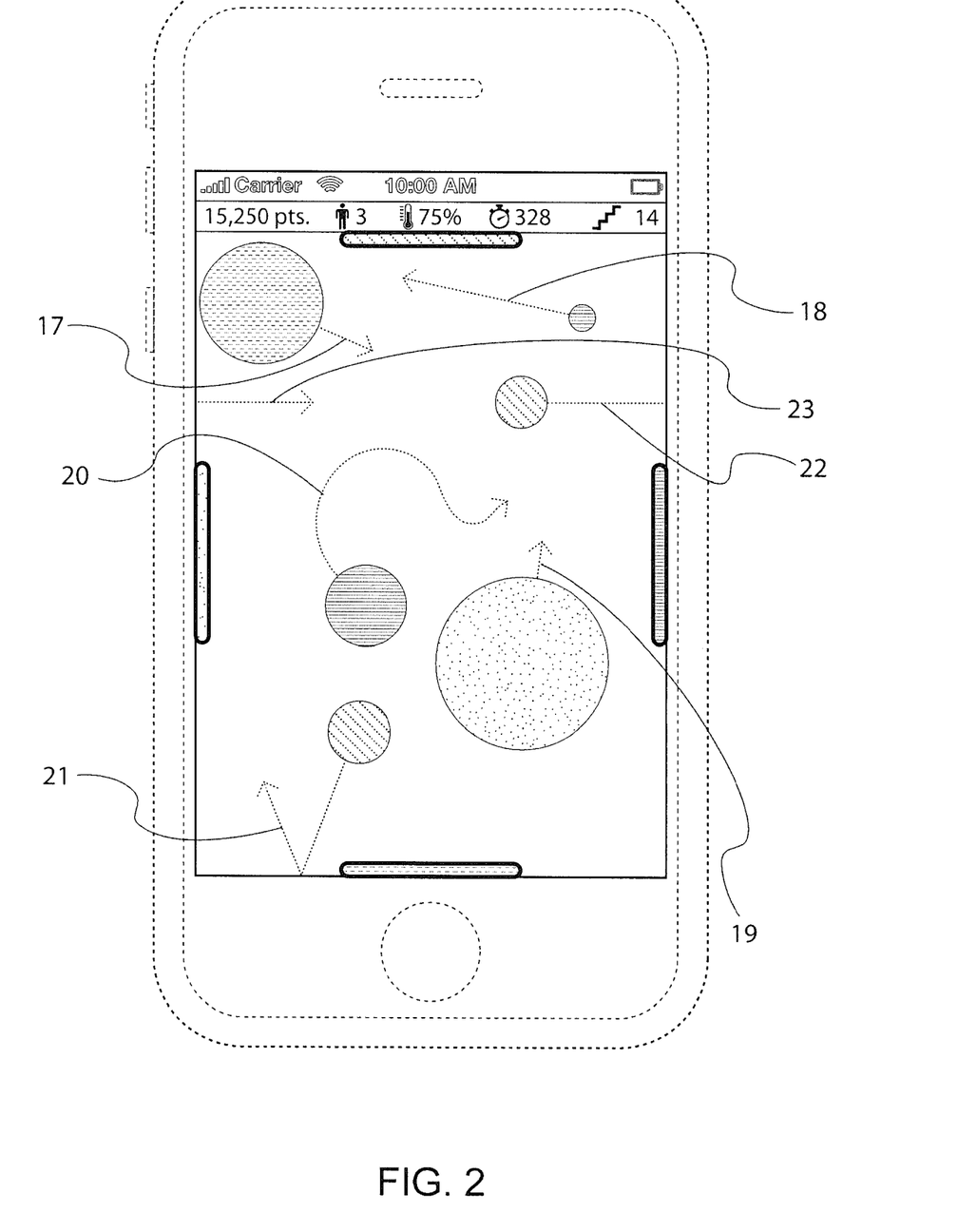
FIG. 2 illustrates the motion of game elements on a display of a portable electronic device.

In the present invention's preferred embodiment the game's playing elements move around the field in different directions and at different speeds. In FIG. 2 this chaotic motion of the game's playing elements is depicted in a range of representational types of motion 17, 18, 19, 20, 21, 22, 23 and boundary behaviors 21, 22, 23 that game elements can exhibit. In the preferred embodiment of the present invention, larger game elements with correspondingly larger potential point scores move more slowly than smaller game elements with correspondingly smaller potential point scores. This differential in speed increases the challenge of the game, in that in game states where a large game element cannot be moved by the player directly or indirectly to a matching or otherwise associated goal, the player may have to wait for the game element's own motion to carry it to a game space location where the user can move it to its goal without contacting a detrimental game element. This differential in speed among game elements is depicted as relative length of the dotted arrow lines 17, 18, 19, 20, 21, 22, 23, where shorter dotted lines with arrows indicate slower motion and longer dotted lines with arrows indicated faster motion. Furthermore, motion of the game elements can be linear 17, 18, 19, 21, 22, 23 or non-linear 20, and the chaotic directions in which game elements move around the game space are represented by the varied directions of the motion-indicating dotted lines arrows 17, 18, 19, 20, 21, 22, 23. Additionally, each game element may cycle between expanding and contracting in size as it moves about the game space, further introducing additional complexity to the game and making playing strategy more challenging.

Figure 3A:
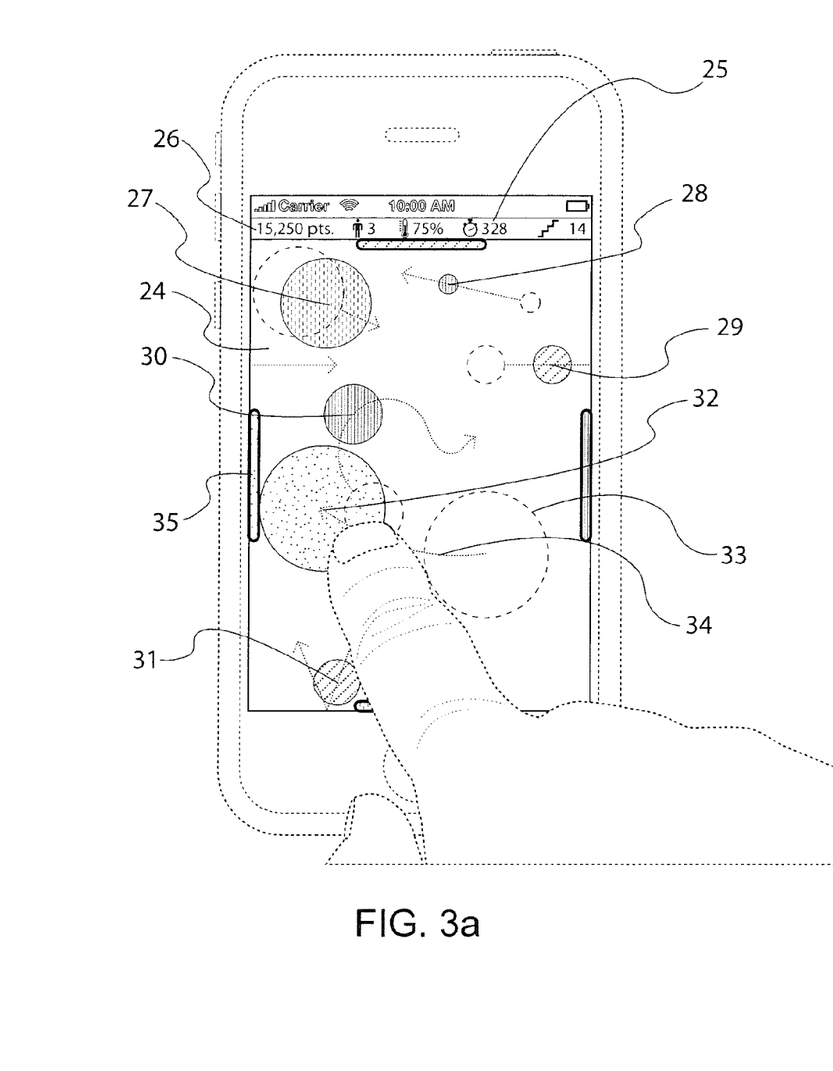
FIGS. 3a and 3b illustrate two sequential game states where a player moves a game element on the display.
Figure 3B:
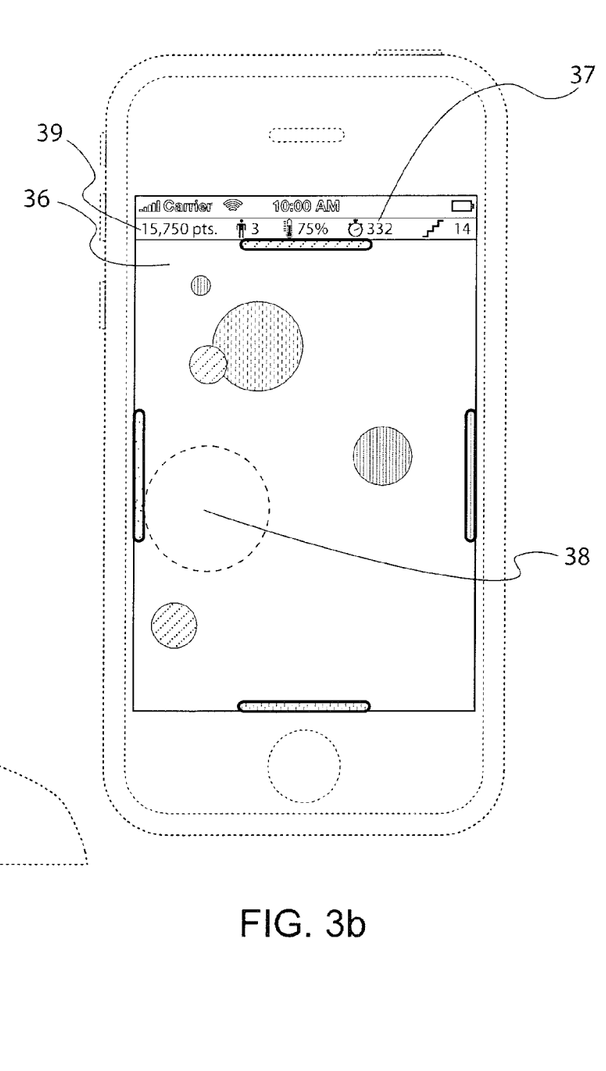

Scoring is supported in the present invention's preferred embodiment by the user successfully moving a game element to its matching or otherwise associated goal, where that goal is one among a plurality of differing goal elements that are simultaneously or non-simultaneously displayed within the game space. FIG. 3 depicts two sequential game states 24, 36 four seconds apart 25, 27 where a player moves a game element 32 from its initial position within the game space 33 amidst and around other moving game elements 27, 28, 30, 31, each of which is moving independently and optionally cycling between expanding and contracting in size, to touch its corresponding or otherwise associated goal 35, thus scoring a goal 37, gaining the game element's goal points 26, 39, and changing state 38. In the example shown, the game element 38 disappears, which is the preferred embodiment and associated with clearing the playing space of all player-moveable game elements in order to advance to the next game level.

Figure 4A:
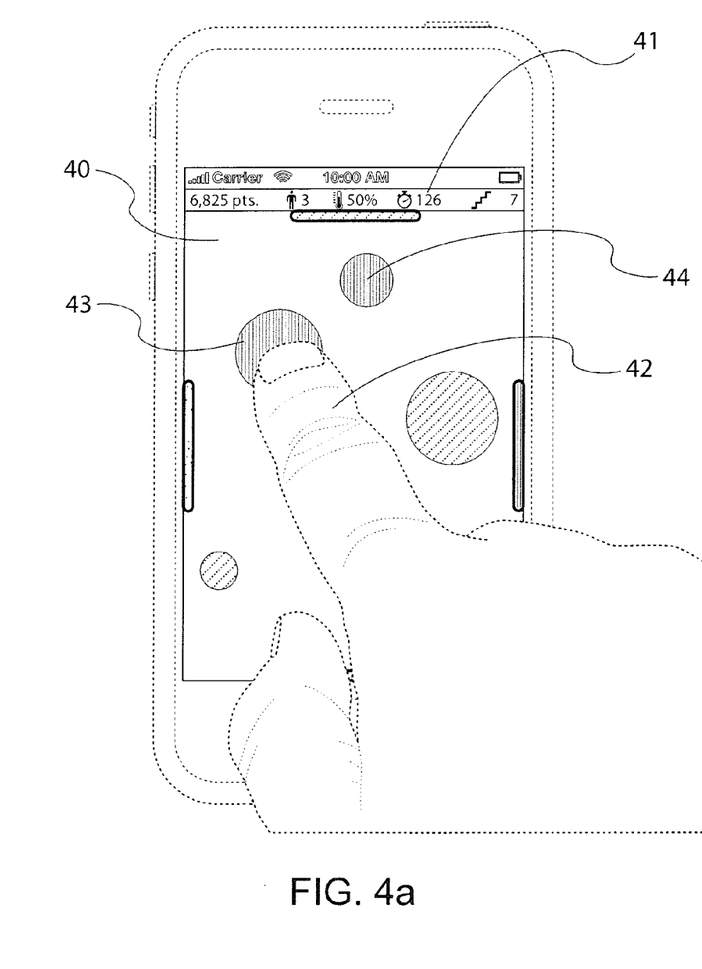
FIGS. 4a and 4b illustrate two sequential game states where the player moves a game element into contact with another game element.
Figure 4B:
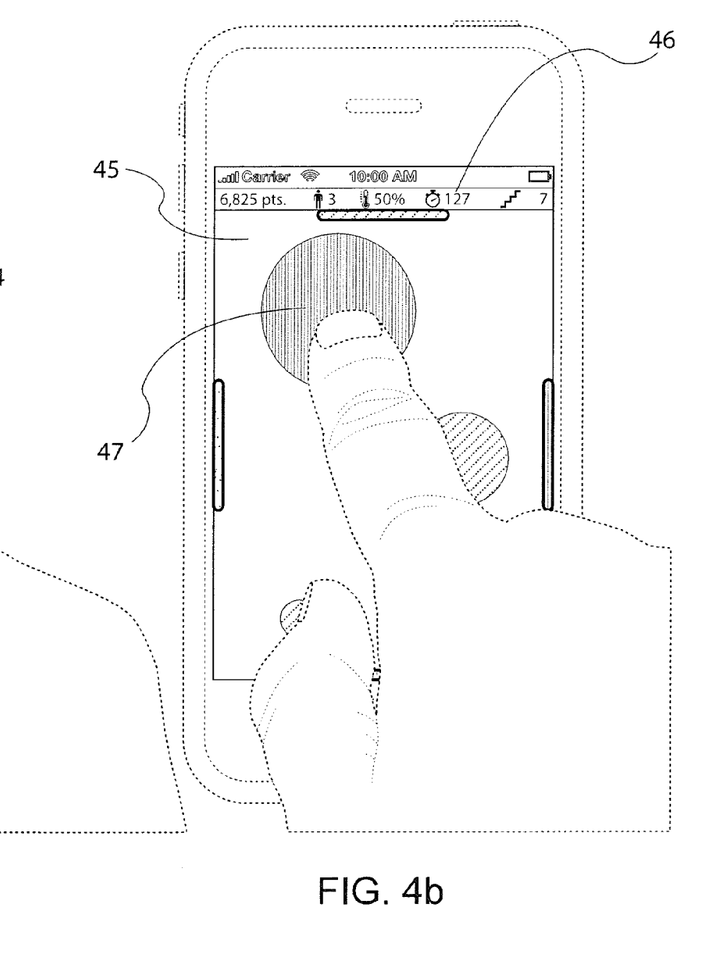

The present invention supports the means for players to take actions that can potentially increase the point value for scored goals. In FIG. 4 two sequential game states 40, 45 are depicted one second apart 41, 46 wherein the user is moving a game element 43 towards and contacting another game element 44 with matching identifying attributes, thereby, in the preferred embodiment, combining the two game elements to create a larger game element with the same identifying attributes 47. In the preferred embodiment of the present invention, the new combined and larger game element is worth more potential scoring points than the sum of the potential scoring points for the two previously individual game elements. It's larger size will however increase the potential difficulty in maneuvering it around other moving game elements and opposing goals in order to successfully contact its matched and associated goal and score its points. The action of combining game elements in this manner may also carry risk of the newly formed larger game element instantly upon creation contacting one or more unmatched and detrimental game elements, or contacting an unmatched or otherwise unassociated goal, thus incurring some detrimental game result or penalty.

Figure 5A:
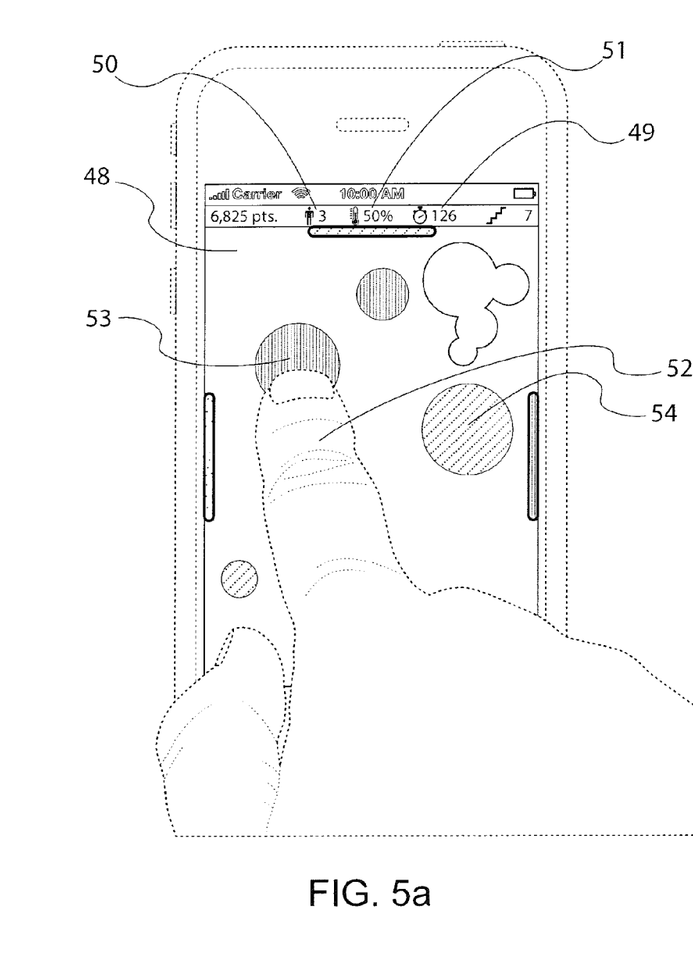
FIGS. 5a and 5b illustrate two sequential game states where the player moves a game element into contact with another game element having different attributes resulting in freezing of the elements.
Figure 5B:
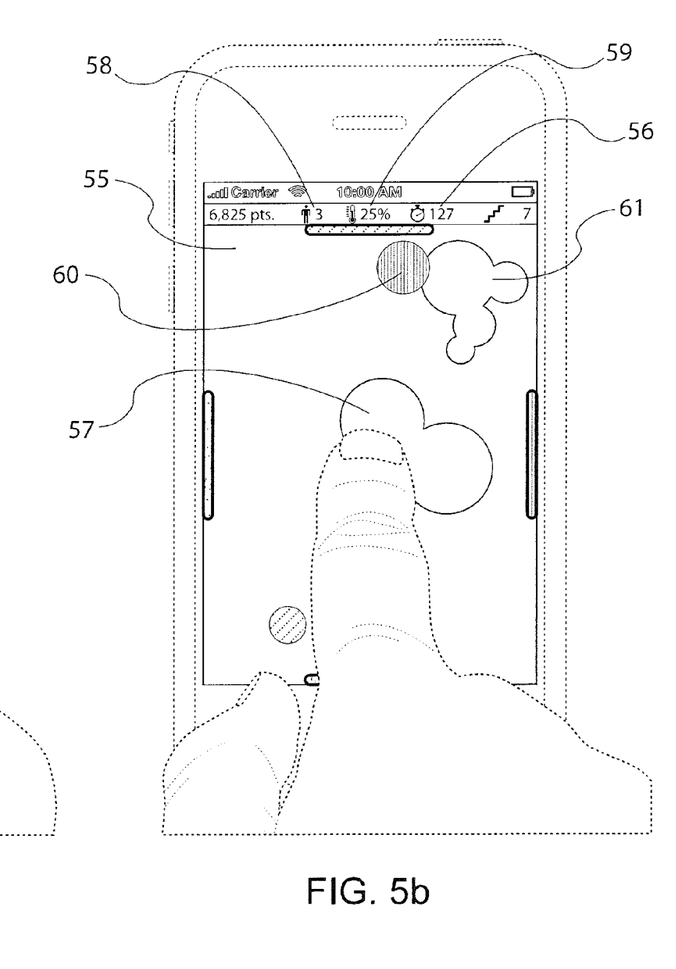

The present invention supports the means for players to commit, on purpose or accidentally, detrimental actions that will result in some negative game result or penalty. FIG. 5 depicts one type of detrimental action. In FIG. 5 two sequential game states 48, 55 one second apart 49, 56 wherein the user is moving a game element 53 towards and contacting another game element 54 with differing identifying attributes, thereby resulting in both game elements freezing into an unmoving obstacle that will remain on the field for the remainder of play at the current game level and reducing the health value as shown in the before and after states 51, 59 of the current game life as shown in the before and after states 50, 58. FIG. 5 also depicts a game element 60 moving on its own across a previously frozen cluster of four game elements 61, which resulted from earlier detrimental game actions.

Figure 6A:
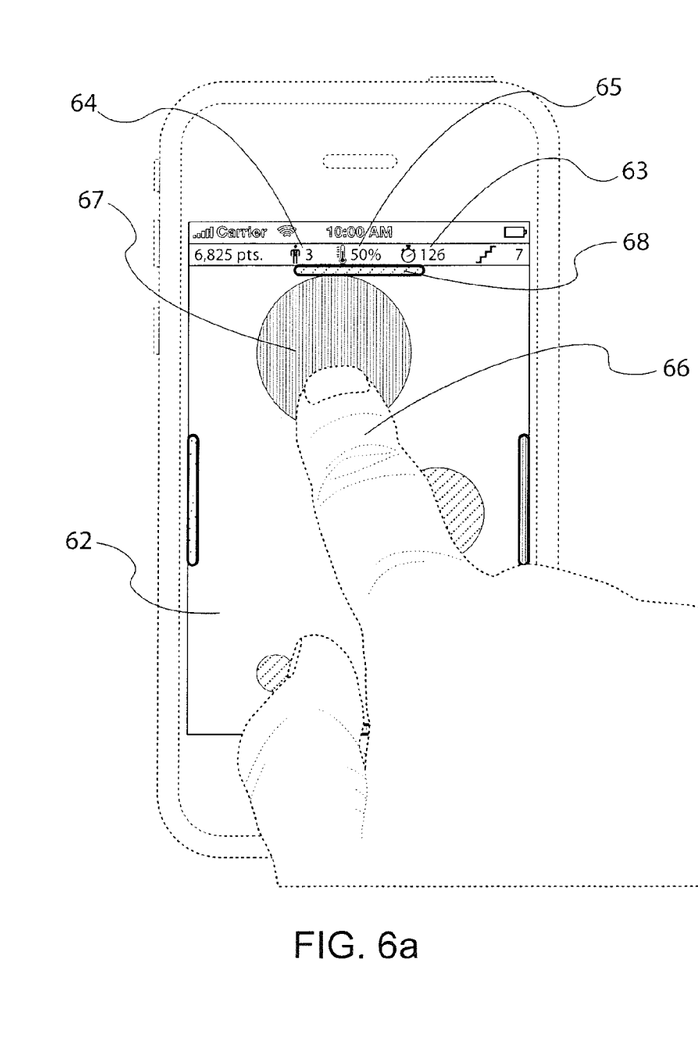
FIGS. 6a and 6b illustrate two sequential game states where the player moves a game element into contact with a goal having different attributes resulting the game element breaking up into a plurality of smaller game elements.
Figure 6B:
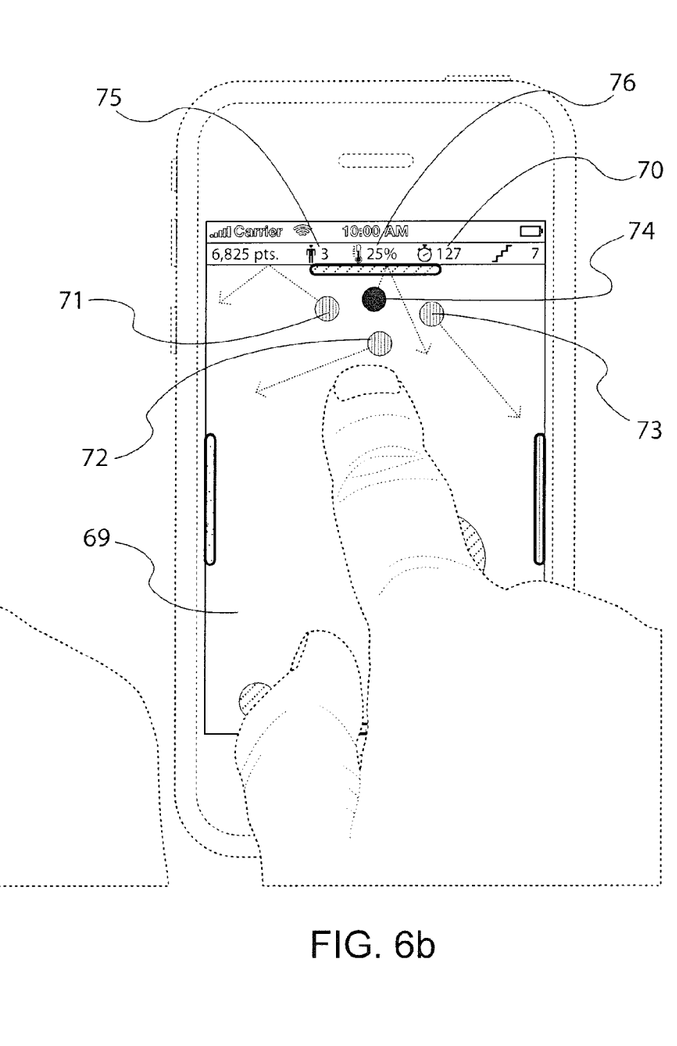

Another type of detrimental game action that the present invention supports is user-caused contact between a game element and any goal that is not matched or otherwise associated with it. FIG. 6 depicts two sequential game states 62, 69 one second apart 41, 46 wherein the user is moving a game element 67 towards and contacting an unmatched and unassociated goal 68, thereby resulting in the game element 67 breaking up into a plurality of smaller game elements 71, 72, 73 each of which moves off in different directions and one or more wandering detrimental game elements 74 herein depicted as black, and resulting in a reduction of the current health value as shown in the before and after states 65, 76 of the current game life as shown in the before and after states 64, 75. Furthermore, the sum of the potential scoring points of the resulting plurality of smaller game elements will be less than the potential scoring points of the former single larger game element. In the preferred embodiment the player may recombine these and other existing game elements to obtain higher potential scoring points including that of the former single larger game element, however this will incur playing time which may be factored into scoring or level bonus calculations.

Figure 7A:
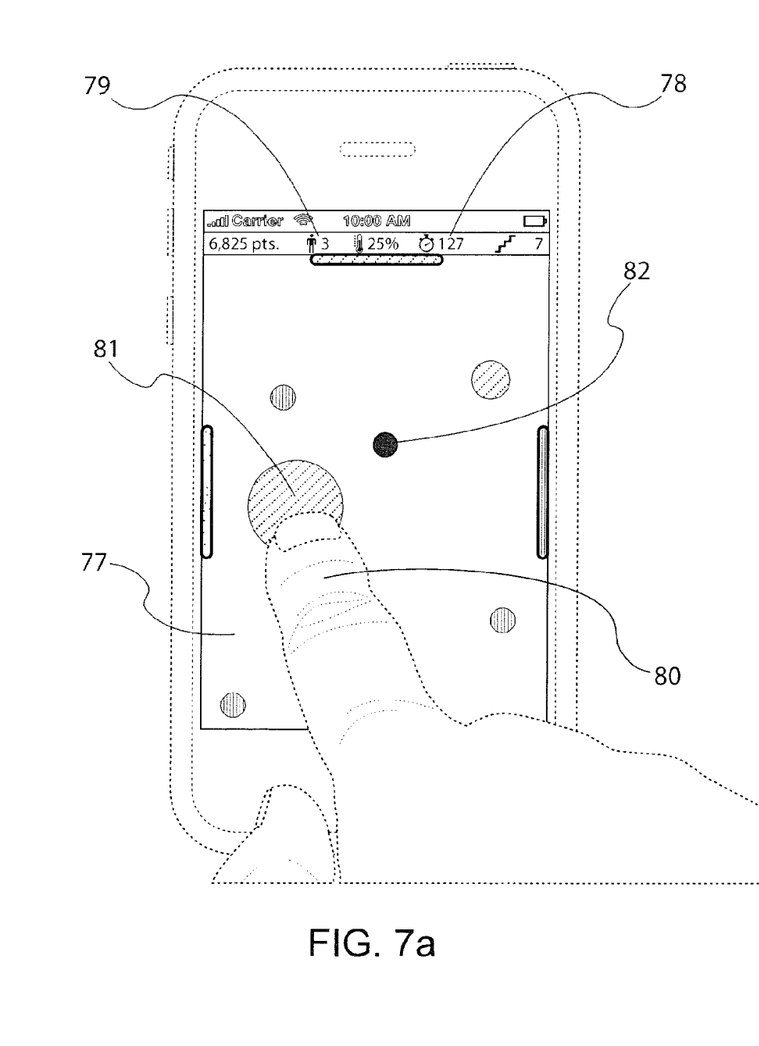
FIGS. 7a and 7b illustrate two sequential game states where the player moves a game element into contact with a detrimental game element resulting in the obliteration of the player-moved game element.
Figure 7B:
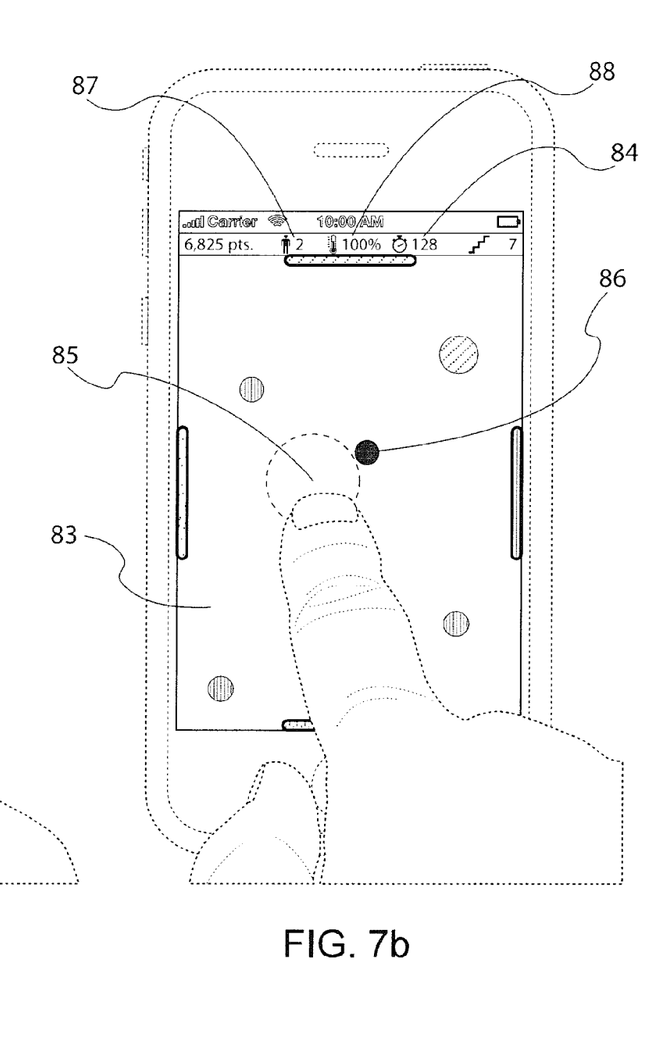

In the preferred embodiment of the present invention, a wandering detrimental game element 74 will cost a game life if the player moves or otherwise causes any game element to contact it. In the preferred embodiment of the present invention, wandering detrimental game elements will persist moving around the game space for the remainder of play at the current game level. FIG. 7 depicts two sequential game states 77, 83 one second apart 78, 84 wherein the user is moving a game element 81 towards and contacting a detrimental game element 82, 86, resulting in the obliteration of the player-moved game element 85, and the forfeiture of a game life shown in the before and after states 79, 87.

Figure 8:
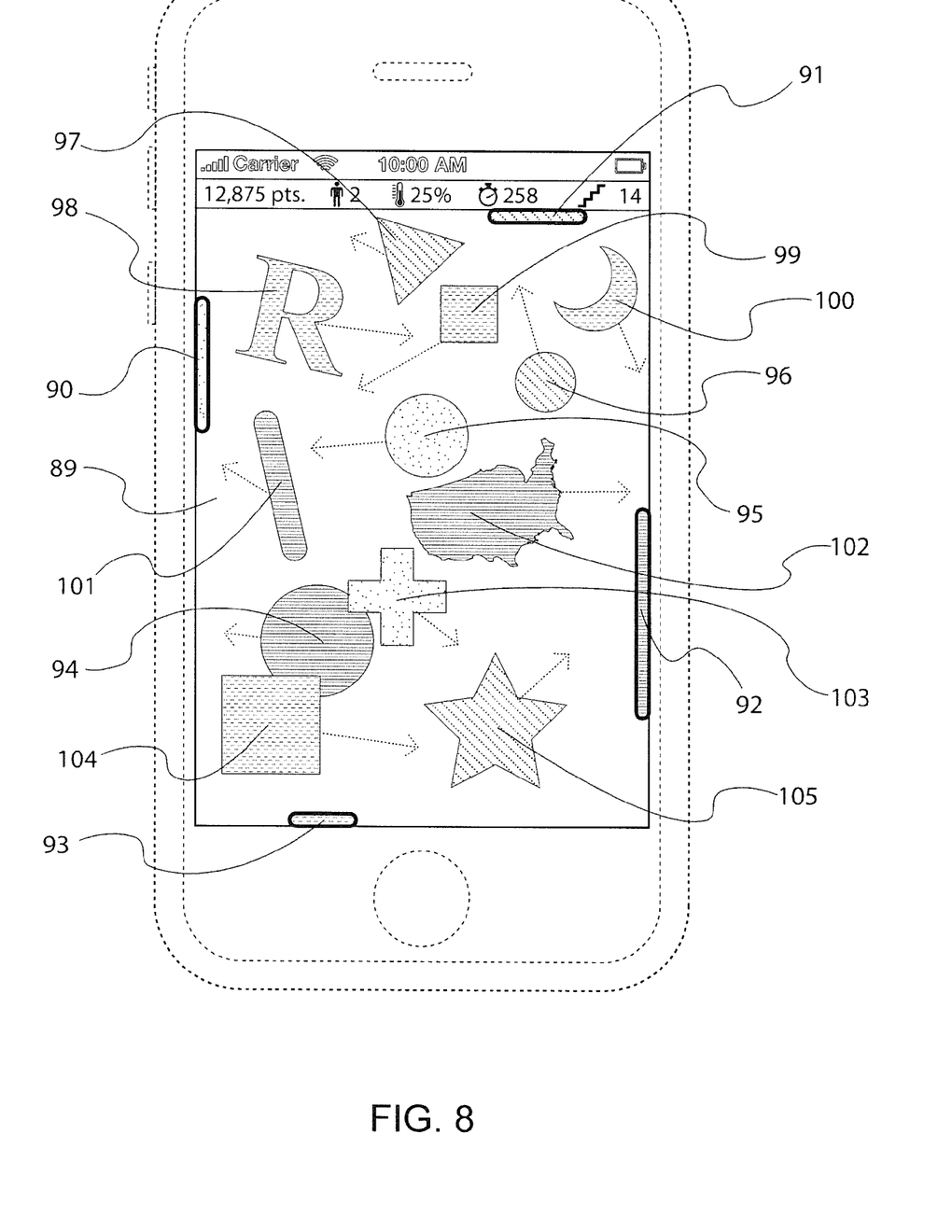
FIG. 8 illustrates an embodiment of a game space with moving and expanding goals and moving game elements in a variety of shapes.

Goal elements exhibiting a variety motion and scaling behaviors and other identifying and differentiating attributes are supported by the present invention. FIG. 8 depicts a game space 89 with differentiated goals 91, 92, 93, 94 that are in motion as well as expanding and contracting in size or in a single dimension such as length. In addition to goals being able to move and cycle between growing and shrinking, goal elements may, but are not limited to, appearing and disappearing randomly or appearing and disappearing in a sequentially cycling pattern.

Game elements within the present invention can also be embodied in a wide variety of shapes and sizes as well as motion and scaling behaviors and other identifying and differentiating attributes are supported by the present invention. FIG. 8 also depicts a range of moving game elements 97, 98, 99, 100, 101, 102, 103, 104, 105 in a variety of shapes but still matching the identifying attributes of their respective corresponding goals. Optionally in some alternative embodiments of the present invention, user-moveable game elements may dynamically shift or otherwise change shape, while retaining the same identifying and differentiating attributes, or may cycle between different identifying and differentiating attributes in a random or sequential pattern.

Figure 9:
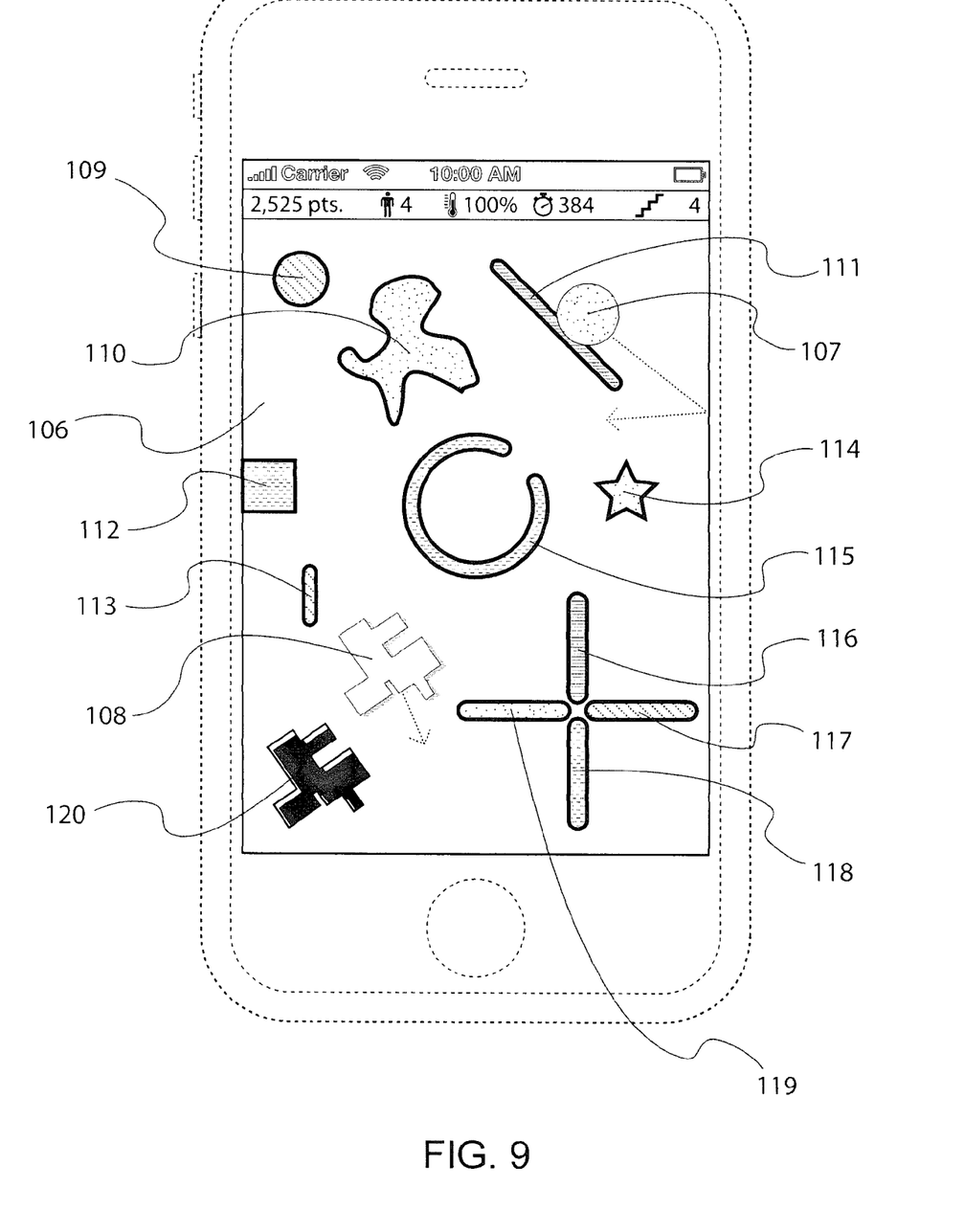
FIG. 9 illustrates an embodiment of a game space with moving goals and game elements having a variety of shapes and scoring requirements.

Goal elements in a wide variety of shapes and configurations, including rules for which portions or regions of their form must be contacted or conditionally satisfied in order to score points, and other identifying and differentiating attributes are supported by the present invention. FIG. 9 depicts a game space 106 with two game elements 107 108 moving around amidst goals in a variety of shapes and scoring requirements 109, 110, 111, 112, 113, 114, 115, 116, 117, 118, 119, 120. In the preferred embodiment of the present invention goals may allow point scoring from a matched and associated game element upon user-controlled contact with any part of their exposed edge 109, 110, 111, 112, 113, 114, 116, 117, 118, 119. In alternate embodiments of the present invention, goals may allow point scoring from a matched and associated game element only upon user-controlled contact with a certain portion of their exposed edge, such as the inside edge of an enclosed goal 115. Still other goals can have other point scoring requirements or conditions that must be met in order to score a goal, such as alignment of matched shapes for game element 108 and corresponding matched and associated goal 120.

Figure 10:
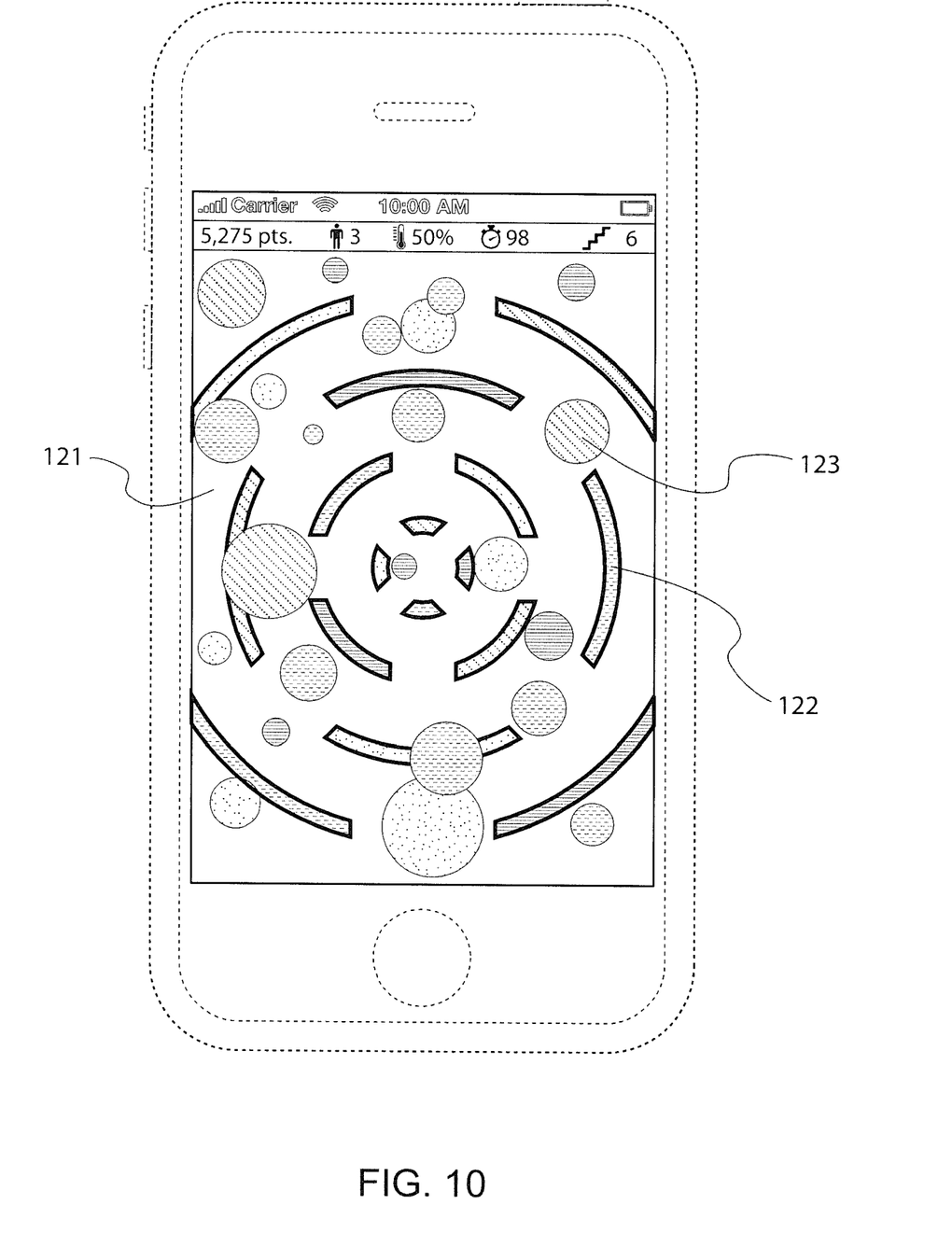
FIG. 10 illustrates an embodiment of a game space where the goals are configured in a maze or manner to constrict the areas or zones within which the player can move game elements.

The present invention supports a wide variety of configurations for a plurality of differentiated goals. FIG. 10 depicts a game space 121 wherein the goals 122 are configured in a maze or manner to constrict the areas or zones within which the player can move game elements around without detrimentally contacting unmatched and unassociated goals. This alternative embodiment of the present invention may have fixed or dynamically-moving, scaling, and/or appearing and disappearing goals and furthermore may have pluralities of goals sharing the same identifying and differentiating characteristics, behaviors, or other types of identifying attributes. The challenge of such an embodiment of the present invention would be that the player would have to wait until game elements were in positions within the game space where they could be touched or moved without incurring detrimental actions and negative game consequences.

Figure 11:
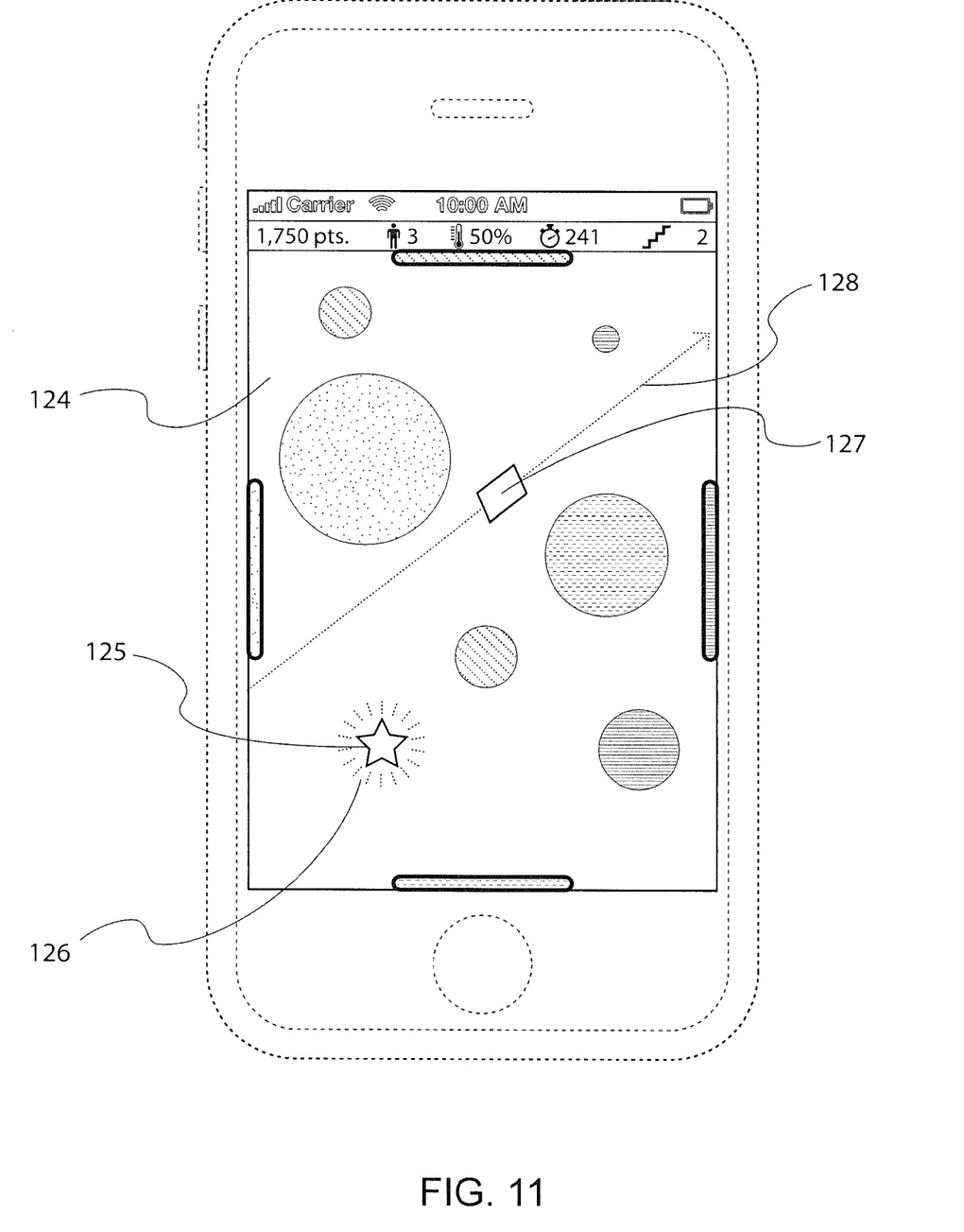
FIG. 11 illustrates an embodiment of a game space in which game elements exhibit visual identifying attributes or characteristics and may appear in random locations.

Additional types of beneficial and detrimental game elements are anticipated and supported by the present invention. FIG. 11 depicts a game space 124 in which secondary game elements 125, 127, which optionally may exhibit, but are not limited to, identifying attributes or characteristics such as flashing 126 or moving 128, may appear or emerge in random locations, and which the player must move game elements with optionally matching or otherwise associated identifying attributes, to make contact with in order to achieve some game benefit or avoid in order to escape some detrimental game penalty. Secondary game elements may also have identifying or differentiating characteristics that match or otherwise associate them with corresponding player-moveable or player-controlled game elements. Furthermore, such secondary game elements may have complex or secondary behaviors such as, but not limited to, emitting additional secondary game elements, or changing between having beneficial and detrimental properties.

While the invention has been described herein with reference to certain preferred embodiments, these embodiments have been presented by way of example only, and not to limit the scope of the invention. Accordingly, the scope of the invention should be defined only in accordance with the claims that follow.

What is claimed is:

1. An electronic game comprising:
   a display screen having a defined playing area;
   a first goal arranged on the defined playing area and having a first color;
   a second goal arranged on the defined playing area and having a second color;
   a plurality of elements moving randomly across the defined playing area under the control of a processor, each of the elements having one of the first or second colors;
   a touch controller configured to allow a user to grab and move one of the moving elements by touching a portion of the display screen over the moving element to establish a point of contact and moving the point of contact across the display screen;
   a game scorer that adds points when an element having the first color is moved by the user using the touch controller to the first goal or when an element having the second color is moved by the user using the touch controller to the second goal; and
   a health indicator which indicates a health value of the user and reduces the health value when a grabbed element is moved by the user into contact with another element having a different color than the grabbed element.

2. The electronic game of claim 1 further comprising:
   a health indicator which indicates a health value of the user and reduces the health value when a grabbed element is moved by the user to a goal having a different color than the grabbed element or when the user touches using the touch controller an element while the element is in contact with a goal having a different color.

3. The electronic game of claim 1 further comprising:
   a detrimental element in the playing area created by the processor by contact of the grabbed element with a goal having a different color than the grabbed element or by contact of the grabbed element with another element having a different color than the grabbed element.

4. The electronic game of claim 3 wherein the health value is reduced when the grabbed element is moved into contact with a detrimental element by the user.

5. The electronic game of claim 1 further comprising:
   an unmoving obstacle in the playing area created by the processor by contact of the grabbed element with another element that has a different color than the grabbed element.

6. The electronic game of claim 1, further comprising:
   at least one additional goal having a different color than the other goals.

7. The electronic game of claim 1, wherein the elements are moved by the processor in random directions at different speeds across the playing area.

8. The electronic game of claim 7 wherein game scorer adds more points by when larger elements are moved to the corresponding goals by the user than when smaller elements are moved to the corresponding goals by the user.

9. The electronic game of claim 1, wherein some of the elements randomly expand into larger elements and some of the elements randomly contract into smaller elements.

10. The electronic game of claim 9, wherein an element stops expanding or contracting upon being touched by the user with the touch controller.

11. An electronic game comprising:
    a display screen having a defined playing area;
    a first goal arranged on the defined playing area and having a first visual indicator;
    a second goal arranged on the defined playing area and having a second visual indicator;
    a plurality of visually differentiated elements moving randomly across the defined playing area under the control of a processor, each of the elements having one of the first or second visual indicators;
    a touch controller configured to allow a user to grab and move one of the moving elements by touching a portion of the display screen over the elements to establish a point of contact and moving the point of contact across the display screen;
    a game scorer that adds points when an element having the first visual indicator is moved by the user using the touch controller to the first goal or when an element having the second visual indicator is moved by the user using the touch controller to the second goal; and
    a health indicator which indicates a health value of the user and reduces the health value when a grabbed element is moved by the user into contact with another element having a different visual indicator than the grabbed element.

12. The electronic game of claim 11 further comprising:
    a detrimental element in the playing area created by the processor by contact of the grabbed element with a goal having a different visual indicator than the grabbed element or by contact of the grabbed element with another element having a different visual indicator than the grabbed element.

13. The electronic game of claim 12 wherein the health value is reduced when the grabbed element is moved into contact with the detrimental element by the user.

14. The electronic game of claim 11 further comprising:
    an unmoving obstacle in the playing area created by the processor by contact of the grabbed element with another element that has a different visual indicator than the grabbed element.

15. The electronic game of claim 11 wherein game scorer adds more points by when larger elements are moved to the corresponding goals by the user than when smaller elements are moved to the corresponding goals by the user.

16. The electronic game of claim 11 wherein the visual indicator is a blinking pattern.

17. The electronic game of claim 11 wherein the visual indicator is a multiple color pattern.

18. The electronic game of claim 11, further comprising:
    at least one additional goal having a different visual indicator than the other goals.

19. The electronic game of claim 11, wherein the elements are moved by the processor in random directions at different speeds across the playing area.

20. The electronic game of claim 11, wherein some of the elements randomly expand into larger elements and some of the elements randomly contract into smaller elements.

21. The electronic game of claim 20, wherein an element stops expanding or contracting upon being touched by the user with the touch controller.

\* \* \* \* \*